Feb. 15, 1938. C. K. LAMB Re. 20,653

SCAFFOLD

Original Filed Oct. 11, 1934 5 Sheets-Sheet 1

Inventor

C. K. Lamb

By Clarence A. O'Brien

Attorney

Feb. 15, 1938. C. K. LAMB Re. 20,653

SCAFFOLD

Original Filed Oct. 11, 1934 5 Sheets-Sheet 2

Inventor

C. K. Lamb

By Clarence O'Brien

Attorney

Feb. 15, 1938. C. K. LAMB Re. 20,653

SCAFFOLD

Original Filed Oct. 11, 1934 5 Sheets-Sheet 3

Inventor

C. K. Lamb

By Clarence O'Brien

Attorney

Feb. 15, 1938. C. K. LAMB Re. 20,653

SCAFFOLD

Original Filed Oct. 11, 1934 5 Sheets-Sheet 4

Inventor

C. K. Lamb

By Clarence A. O'Brien

Attorney

Feb. 15, 1938. C. K. LAMB Re. 20,653
SCAFFOLD
Original Filed Oct. 11, 1934 5 Sheets-Sheet 5
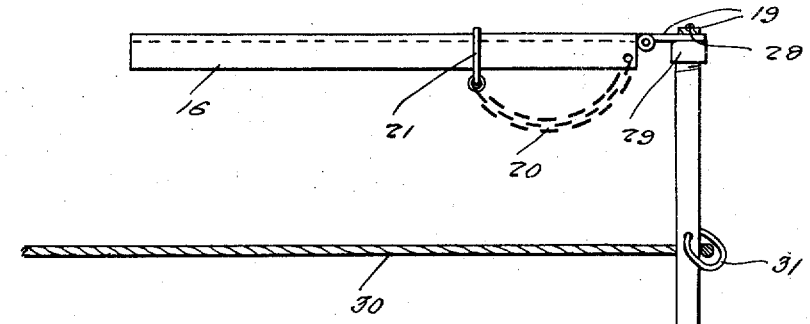
Fig. 5.
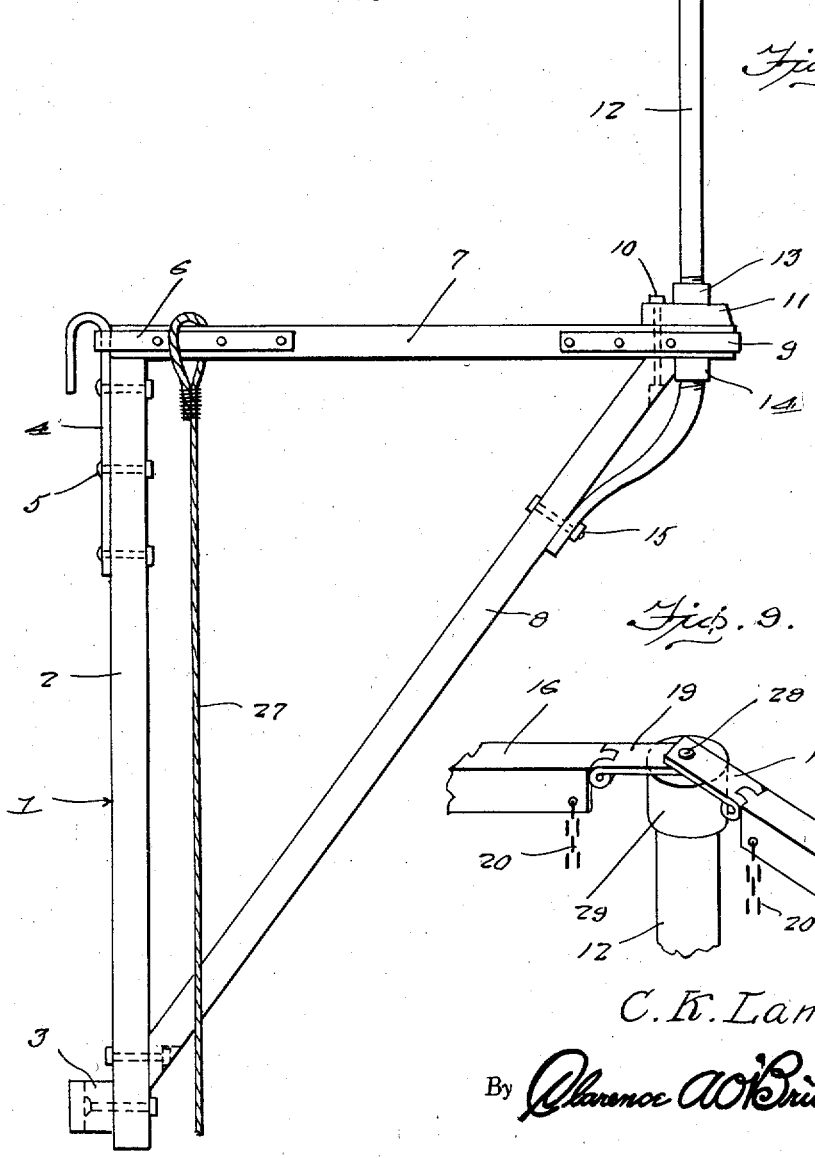
Fig. 9.
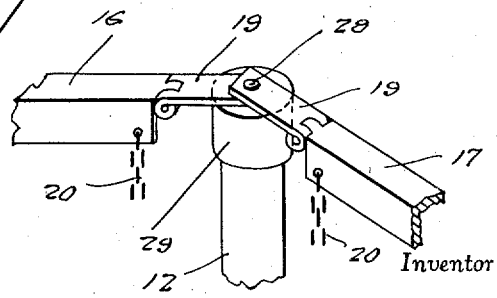
Inventor
C. K. Lamb
By Clarence O'Brien
Attorney Reissued Feb. 15, 1938

Re. 20,653

UNITED STATES PATENT OFFICE 20,653

SCAFFOLD

Clyde K. Lamb, Cleveland, Ohio, assignor to The Safety Scaffold Corporation, Cleveland, Ohio, a corporation of Ohio Original No. 2,066,984, dated January 5, 1937, Serial No. 747,941, October 11, 1934. Renewed August 18, 1936. Application for reissue April 29, 1937, Serial No. 139,724

7 Claims. (Cl. 304—13)

This invention relates to scaffolds and has as its object the provision of a scaffold especially adapted for use in repairing chimneys and the like.

An object of the invention is to provide a scaffold having improved safety means over the scaffolds now generally employed.

A still further object of the invention is to provide a scaffold having a novel form and construction of guard rail.

A still further object of the invention is to provide a scaffold which may be readily adapted to chimneys or smoke stacks of either cylindrical, square or octagon shape in cross section.

A still further object of the invention is to provide a scaffold capable of a wide range of adjustment for adapting the same to chimneys and the like of the cross sectional shapes mentioned.

The invention together with its objects and advantages, will be best understood from a study of the following description taken in connection with the accompanying drawings wherein:

Fig. 1 is a view partly in section and partly in elevation illustrating the application of the invention to a chimney or smoke stack;

Figs. 2 and 3 are detail views taken substantially on the lines 2—2 and 3—3 respectively of Fig. 1;

Fig. 5 is an elevational view of a bracket and part of the guard rail structure associated therewith;

Fig. 9 is a detail perspective view showing the manner of securing the guard rail to one of the rail posts;

Figure 1:
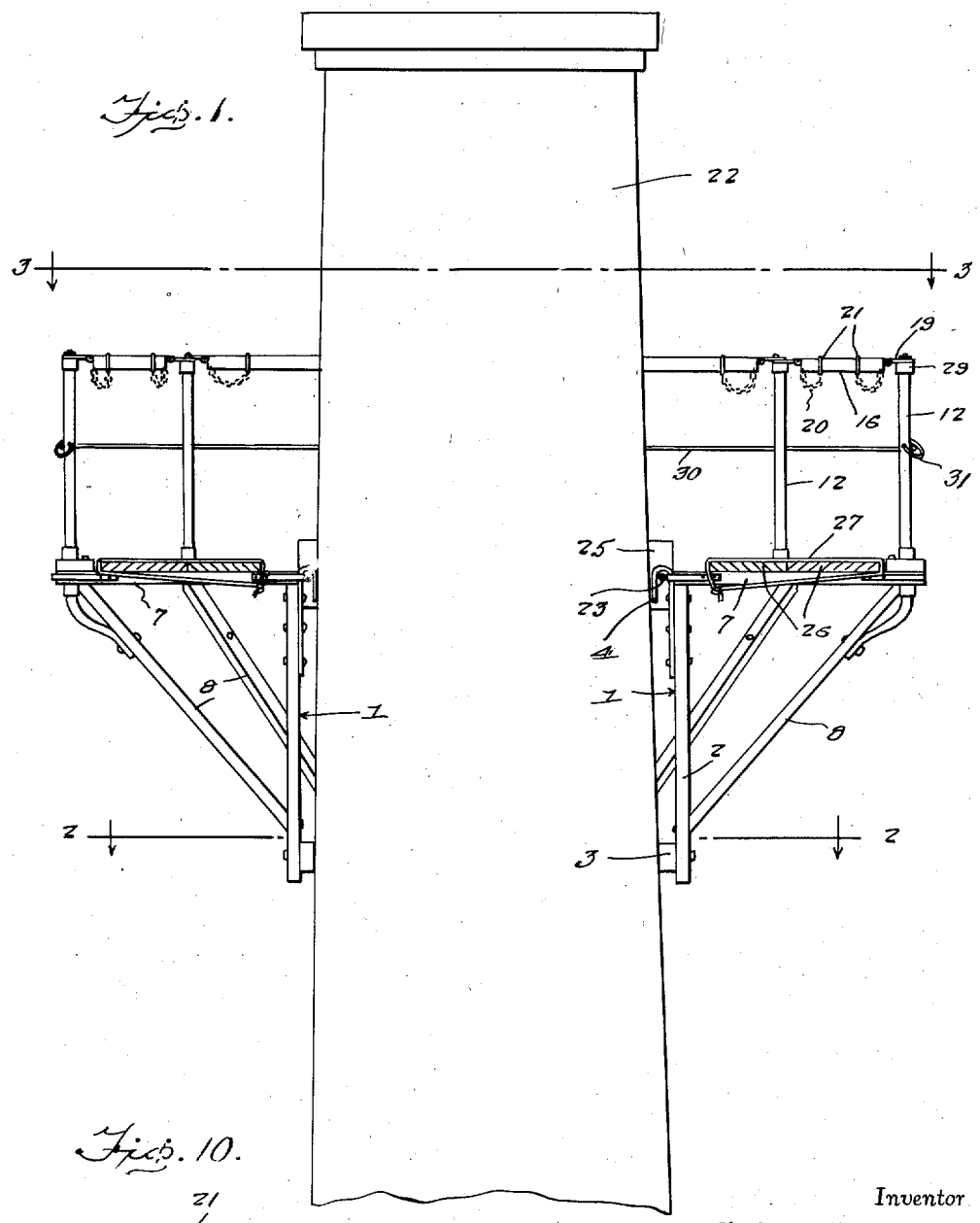

Referring to the drawings by reference numerals, it will be seen that any number of substantially triangular brackets 1 are provided. The sides of each bracket 1 are formed preferably of wood and the side 2 of each bracket that is adapted to be disposed adjacent to and parallel with the chimney is provided at its lower end, and on the side confronting the chimney with a spacer block 3 shaped to conformably fit against the chimney wall. At its upper end the side 2 of the bracket is provided with a hook 4 that is formed from a metal strap and is secured to the bracket by rivets 5 and a retaining strap 6 all of which is clearly shown in Fig. 5.

At the joined ends of the sides 7 and 8 of the bracket, the side 7 of the bracket is reinforced by a strap 9 and has secured to its top side by rivets 10 an apertured block 11, the aperture of which registers with an aperture in the extended end of the side 7 of the bracket. Extending through the aligned apertures in the side 7 and block 11 is a threaded portion of a guard rail post 12. Screwed onto the guard rail post 12 are upper and lower sleeves 13 and 14 that respectively are threaded home against the block 11 and the underside of the bracket member 7 to positively secure the post 12 to the bracket. The lower end of the post 12 is bent inwardly, flattened, and secured to the side 8 of the bracket by a rivet as at 15.

Figure 10:
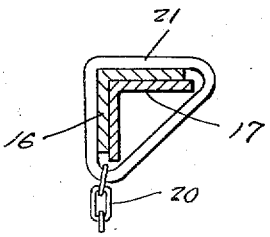
Fig. 10 is a detail sectional view showing the manner of retaining the sliding members of a section of the hand rail in slideable assembled relation.
Figure 2:
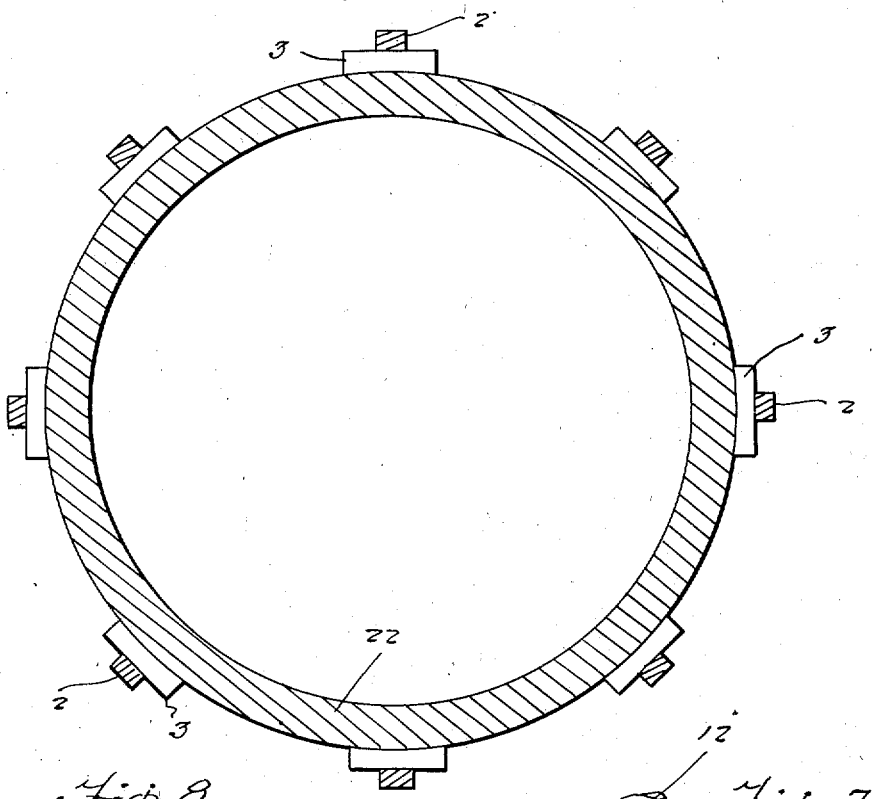
Figure 8:
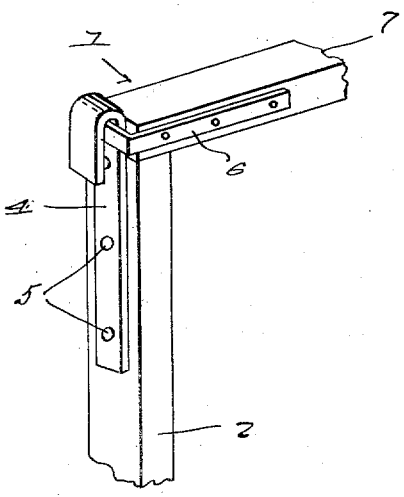
Fig. 8 is a perspective view showing the suspension hook associated with the bracket.
Figure 7:
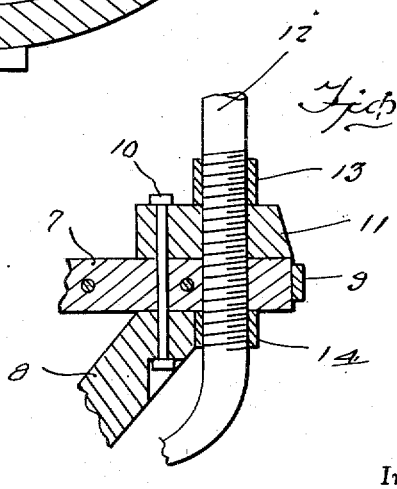
Fig. 7 is a fragmentary detail sectional view showing the manner of securing one of the guard rail posts to one of the brackets.

The post 12 supports a guard rail consisting of a plurality of pairs of slideably associated angle bars 16 and 17, each one of which at one end has hinged thereto as at 18 an attaching leaf or extension 19. Each angle bar has secured to the hinged extension equipped end thereof one end of a chain 20, the other end of which is provided with a frame 21, of triangular shape. Frame 21 embraces the members 16 and 17 in a manner shown in Fig. 10 and serves to retain said members in sliding engagement.

Figure 3:
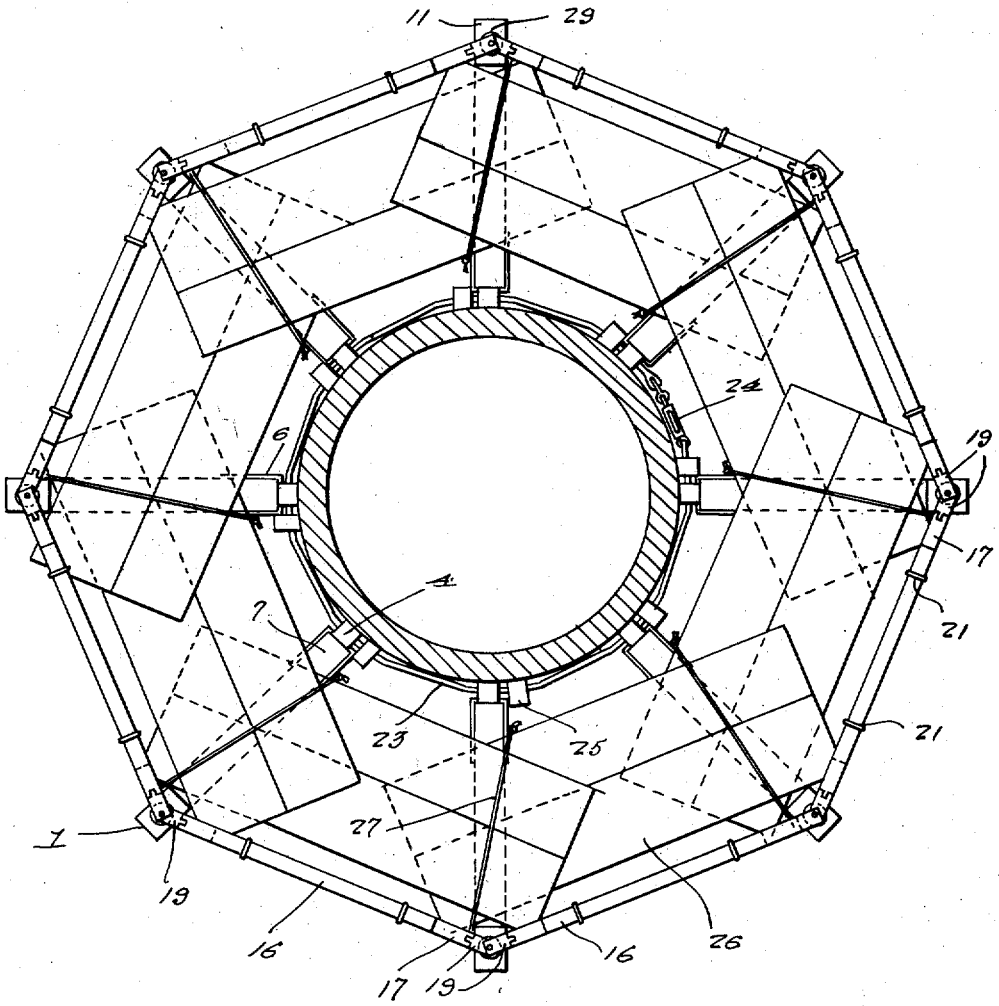
Figure 6:
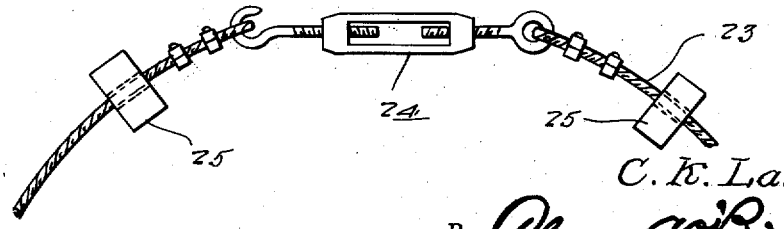
Fig. 6 is a fragmentary plan view of the connected ends of the securing cable.
Figure 4:
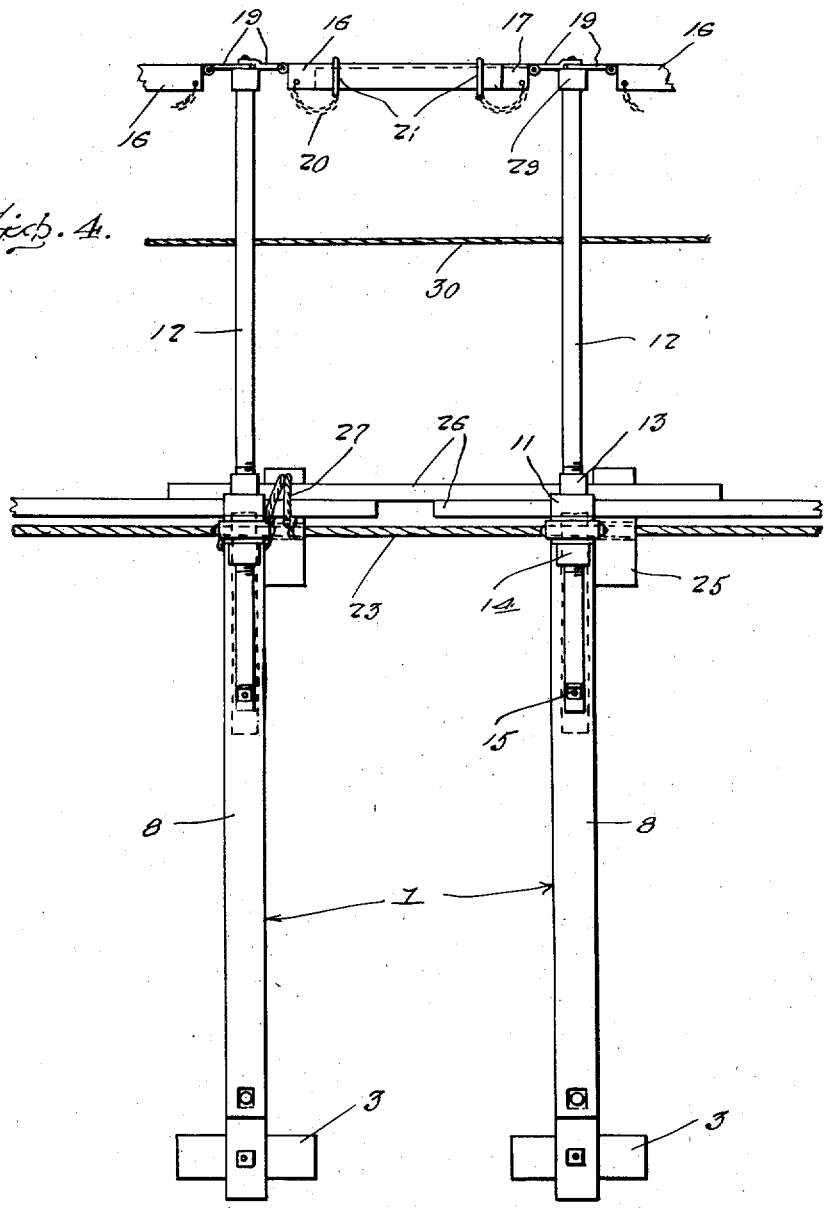
Fig. 4 is a fragmentary elevational view of a portion of the scaffold.

In actual practice, there is first secured about the chimney or stack 22 at the desired elevation a cable 23 the ends of which are drawn together and connected through the medium of a suitable turnbuckle 24. A plurality of apertured spacer blocks 25 are slideably associated with the cable 23 and engage the chimney 22 in the manner clearly shown in Fig. 3 for slightly spacing the cable 23 relative to the stack of chimney.

The required number of brackets 1 are then brought into use, each bracket having its hook 4 engaging over the cable 23 in a manner clearly shown in Fig. 1. The brackets 1 to the desired number are spaced circumferentially about the stack 22 as suggested in Fig. 3. The floor boards 26 for the scaffold are then arranged about the stack 22 being properly supported by the brackets 1 as clearly shown in Fig. 3. The floor boards 26 are fastened or secured in place through the medium of suitable cables 27 and in a manner now generally resorted to.

Figure 11:
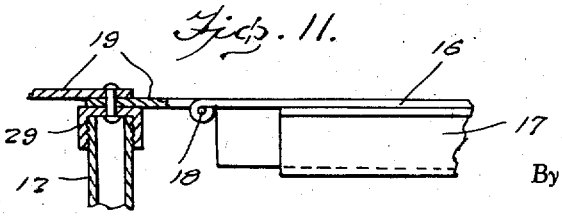
Fig. 11 is a detail view showing the manner of securing one end of a guard rail section to one of the guard rail posts.

The guard rail made up of the slideably engaged members 16 and 17 is next set up, the extension leaves 19 of the sections or members 16 and 17 being riveted as clearly shown in Fig. 9 and indicated at 28 to threaded caps 29 that are screwed onto the upper ends of the posts or standards 12 as clearly shown in Fig. 11.

As an added precaution, a guard cable 30 may be employed and the same extends around the scaffold below the hand rail, being threaded through suitable rings 31 provided on the posts or standards 12 at suitable points downwardly from the upper ends of said standards. The ends of the cable 30 may be secured together in any suitable manner, if desired, being equipped with snap fasteners to engage certain of the rings 31 in a manner thought apparent and to secure the cable 30 in proper position.

It is thought that, from the above, a clear understanding of the construction, use and advantages of a scaffold of this character will be readily had and that it will be observed that such a scaffold may be set up with a minimum amount of labor and in a minimum amount of time and will provide a safe working platform for steeplejacks, chimney sweeps and the like.

What is claimed is:

1. In a scaffold of the character described, a plurality of floor board supporting brackets adapted to be mounted on the structure upon which work is to be done, posts rising vertically from said brackets, and guard rail sections connecting adjacent posts, each guard rail section including a pair of telescoping members, each member being provided at one end with a hinged leaf secured to a post, a flexible element secured at one end to the leaf equipped end of each element, and a frame member secured to the free end of the flexible element and embracing the telescoping members of the sections for retaining said members in assembled relation.

2. A guard rail for a scaffold comprising a plurality of posts adapted to be secured at one end to the scaffold to extend vertically upwardly from the floor of the scaffold, and guard rail sections supported between pairs of adjacent posts, each guard rail section comprising a pair of slideably associated members each of which is provided at one end with a leaf hinged thereto and adapted to be secured to a post, retaining frames embracing the slideably engaged members, and flexible elements connecting said frames with said members.

3. A guard rail including a pair of angle iron members slideably engaging one another, each of said members having an attaching leaf hinged to one end thereof, a triangular loop embracing said members for retaining the latter in telescoping relation, and flexible means connecting said loop with one of the angle iron members.

4. In a scaffold of the character described, a plurality of floor board supporting brackets adapted to be mounted upon the structure to be worked upon, posts extending upwardly from said brackets, and guard rail sections connecting adjacent posts, each guard rail section including a pair of slideably engaged longitudinally adjustable members, each member being provided at one end with a hinged leaf secured to a post and slideable means maintaining said members in engaged relation.

5. In a scaffold of the character described, a plurality of floor board supporting brackets adapted to be mounted upon a structure to be worked upon, posts extending upwardly from said brackets, guard rail sections connecting adjacent posts, each guard rail section including a pair of longitudinally adjustable members, each member being provided at one end with a hinge leaf secured to a post, and slideable means encircling each of said members to maintain them in assembled relation.

6. In a scaffold of the character described, a plurality of floor board supporting brackets adapted to be mounted upon a structure to be worked upon, posts extending upwardly from said brackets, guard rail sections connecting adjacent posts, each guard rail section including a pair of relatively slideable and longitudinally adjustable members, each member being provided at one end with a hinge leaf secured to a post, detachable means maintaining said members in assembled relation and comprising an element encircling each of said members, and flexible means securing said element to the scaffold.

7. In a scaffold of the character described, a plurality of floor board supporting brackets adapted to be mounted upon a structure to be worked upon, posts extending upwardly from said brackets, guard rail sections connecting adjacent posts, each bracket being generally triangular in form and comprising an upright portion, a horizontally extending portion, and an interconnecting brace, each post being projected through the horizontally extending bracket portion and rigidly secured at its lower end to the brace, and the upper end of each post being adapted to detachably engage a pair of guard rail sections.

CLYDE K. LAMB.